(12) United States Patent
Gershenson (10) Patent No.: US 7,001,517 B2
(45) Date of Patent: Feb. 21, 2006

(54) COLLAPSIBLE FILTER ELEMENT

(76) Inventor: Moshe Gershenson, P.O. Box 609 3012 High St., Mohegan Lake, NY (US) 10547

( * ) Notice: Subject to any disclaimer, the term of this patent is extended or adjusted under 35 U.S.C. 154(b) by 0 days.

(21) Appl. No.: 10/266,498

(22) Filed: Oct. 8, 2002

(65) Prior Publication Data

US 2003/0029813 A1    Feb. 13, 2003

Related U.S. Application Data

(60) Division of application No. 09/864,717, filed on May 23, 2001, now Pat. No. 6,511,598, which is a continuation-in-part of application No. 09/481,604, filed on Jan. 12, 2000, now Pat. No. 6,238,560, which is a continuation of application No. 09/115,118, filed on Jul. 14, 1998, now Pat. No. 6,030,531.

(60) Provisional application No. 60/057,759, filed on Sep. 2, 1997.

(51) Int. Cl.
*B01D 29/27*    (2006.01)

(52) U.S. Cl. ................. 210/342; 210/487; 210/497.01; 210/451

(58) Field of Classification Search ............... 210/337, 210/338, 342, 487, 315, 256, 345, 347, 339, 210/346, 323.2, 232, 497.01, 451; 55/380, 55/342, 343, 485, 322

See application file for complete search history.

(56) References Cited

U.S. PATENT DOCUMENTS

| | | | |
|---|---|---|---|
| 410,767 A | 9/1889 | Pierce | |
| 446,342 A | 2/1891 | Goodacre | |
| 575,478 A | 1/1897 | Haefner | |
| 1,647,799 A | 11/1927 | Hammer | |
| 1,754,320 A | 4/1930 | Hopkins | |
| 1,840,153 A | 1/1932 | Bull | |
| 2,387,368 A | 10/1945 | Vokes | |
| 2,405,838 A | 8/1946 | Lawson et al. | |
| 2,792,118 A | 5/1957 | Kraissl, Jr. | |
| 3,029,951 A | 4/1962 | Cannon | |
| 3,053,391 A | 9/1962 | Nelson | |
| 3,249,228 A | 5/1966 | Arvanitakis | |
| 3,261,468 A | 7/1966 | Dick | |
| 3,262,563 A | 7/1966 | Pall | |
| 3,280,982 A | 10/1966 | Barto | |
| 3,347,386 A | 10/1967 | Kraissl, Jr. | |
| 3,420,377 A | 1/1969 | Vandersip | |
| 3,672,506 A | 6/1972 | Syrjanen | |

(Continued)

FOREIGN PATENT DOCUMENTS

JP          63-107708       7/1992

OTHER PUBLICATIONS

Loftex* "System 10" Special Filter Bag, Loeffler Filter-Technik GMBH, not dated.

*Primary Examiner*—Terry K. Cecil
(74) *Attorney, Agent, or Firm*—Reed Smith LLP (57) ABSTRACT

A filter element assembly has at least two cylindrically shaped and concentrically arranged filter media sleeves each connected at one end thereof to an inlet plate and each connected at the other end to a closed end terminal plate. Openings are provided in the inlet plate to permit entry of liquid to be filtered into the annular space between the filter sleeves. The closed end terminal plate prevents flow of unfiltered liquid from the annular space between the sleeves so as to force the liquid through the porous media of the sleeves to effect filtration.

22 Claims, 11 Drawing Sheets

U.S. PATENT DOCUMENTS

| | | |
|---|---|---|
| 3,890,290 A | 6/1975 | McCabe |
| 4,081,379 A | 3/1978 | Smith |
| 4,166,793 A | 9/1979 | Turetsky |
| 4,253,959 A * | 3/1981 | Tafara |
| 4,285,814 A | 8/1981 | Morgan, Jr. |
| 4,496,459 A | 1/1985 | Rosaen |
| 4,609,465 A | 9/1986 | Miller |
| 4,669,167 A | 6/1987 | Asterlin |
| 4,749,485 A | 6/1988 | DeGraffenreid |
| 4,769,052 A | 9/1988 | Kowalski |
| 4,877,526 A | 10/1989 | Johnson et al. |
| 4,956,089 A | 9/1990 | Hurst |
| 5,102,545 A | 4/1992 | Hoffman |
| 5,152,890 A | 10/1992 | Linnersten |
| 5,269,919 A | 12/1993 | von Medlin |
| 5,312,544 A | 5/1994 | Kinney |
| 5,358,638 A | 10/1994 | Gershenson |
| 5,417,855 A | 5/1995 | Gershenson |
| 5,431,706 A | 7/1995 | Paas |
| 5,454,945 A | 10/1995 | Spearman |
| 5,484,529 A | 1/1996 | Malugade et al. |
| 5,573,666 A | 11/1996 | Korin |
| 5,624,559 A * | 4/1997 | Levin et al. |
| 5,645,721 A | 7/1997 | Carroll, Jr. |
| 5,910,247 A | 6/1999 | Outterside |
| 6,030,531 A | 2/2000 | Gershenson |

* cited by examiner

COLLAPSIBLE FILTER ELEMENT

CROSS REFERENCE TO RELATED APPLICATION

This application is a division of application Ser. No. 09/864,717 filed May 23, 2001 (now U.S. Pat. No. 6,511,598), which was a continuation-in-part of application Ser. No. 09/481,604 filed Jan. 12, 2000 (now U.S. Pat. No. 6,238,560), which was a continuation of application Ser. No. 09/115,118 filed Jul. 14, 1998 (now U.S. Pat. No. 6,030,531) which claimed the priority of provisional application Ser. No. 60/057,759 filed Sep. 2, 1997, the contents of which is incorporated herein by reference.

FIELD OF THE INVENTION

This invention relates generally to the field of liquid filtration devices and more particularly to filter elements and filter element assemblies known as bag filters and cartridge filters. In particular, this invention is directed to a filter element assembly, for use in a bag filter system or in a cartridge filter system, and has at least two concentrically arranged filter media sleeves connected at one end by an inlet end plate and at the other end by a terminal end plate, and which is adapted to be disposed within a generally cylindrical filter housing.

BACKGROUND OF THE INVENTION

Bag and cartridge filter systems for liquid filtration are well known in the art and generally comprise a cylindrically shaped filter vessel typically closed at one end, with a removable or openable cap at the other end. Inlet and outlet conduits are connected to the vessel for delivering liquid to be filtered thereto and for removing filtered liquid therefrom. Replaceable filter elements are arranged within the cylindrical vessel in order to filter liquids entering the vessel. Typically bag filters consist of filter media having an open upper end and a closed bottom. The filter bag is usually supported within the vessel within an open mesh tubular basket or cage which is typically suspended within the housing. The basket is intended to support the media of the filter bag to prevent it from bursting as the bag fills with liquid. An example of such a well known filter bag arrangement is shown in the U.S. Pat. Nos. 4,285,814 and 4,669,167. Typical cartridge filters consist of a filter medium (such as filter paper) which is frequently pleated and in which the edges of the medium are brought together to form a cylindrical configuration with the pleats extending either axially or longitudinally. The edges are typically joined together with an adhesive, stitching or other means to maintain the cylindrical configuration. It is also common for the pleated media to be supported by a perforated cylindrical outer cage. End caps are typically received on either end of the filter element with appropriate adhesive being applied between the end caps and the media. One of the end caps has a central opening such that fluid passing radially through the filter media is allowed to flow through the opening to an outlet passage in the housing. Fluid to be filtered typically enters the housing so that it is caused to pass from the outside of the cylindrical configuration radially through the filter medium to the interior space in the center of the cylindrical configuration and then out through an opening in an end cap. An example of such a cartridge is shown in U.S. Pat. No. 4,609,465. Filter cartridges of the foregoing type have become quite popular.

One disadvantage of the popular cartridge is that the flow of liquid to be filtered is from the outside of the element to its inner core resulting in dirt or contaminants remaining behind in the housing when the cartridge element is removed from its housing for replacement. Filter bag arrangements have numerous advantages over cartridge systems. One such advantage is that the liquid to be filtered enters the filter bag at its open end so that the liquid can pass through the porous side-walls of the bag and filtered liquid can exit the filter vessel from the space between the outer bag surface and the inner wall of the vessel. In this manner dirt or contaminants can be contained within the bag and easily removed upon opening the vessel, allowing replacement with a clean filter bag. However, this typical arrangement presents a number of severe limitations which inhibits the use of bag filters for certain applications. These limitations relate to the fact that bag filter vessels are typically larger than cartridge housings, but the bag filter elements provide only a limited active filtration surface area and limited life. Bag filters also have a large volume of liquid within the enclosed volume of the bag. If the contours and shape of the bottom of the bag filter does not exactly coincide with the contours and shape of the retaining basket, filter bags will have a tendency to burst as a result of the large volume of liquid which it contains. As a result, most bag filter media can not be manufactured from high efficiency filtration media which is usually more delicate than the more coarse filter media typically used in liquid filter bags. The typical filter bag is also difficult to insert and remove from the vessel as it has no rigid structure other than possibly a retaining ring at the open top end. Filter bags rarely provide a reliable bypass seal even when constructed with elastomeric sealing members at the open top end.

Because filter bags have a large holding volume for liquid, removal of a used bag is quite difficult since the bag is typically filled with liquid, which makes the bag heavy and may contain hazardous substances. In order to alleviate this situation, evacuation balloons are frequently used inside the bags to reduce the liquid holding capacity. Handling of such balloons, however, is cumbersome and usually does not overcome this problem. A well known conventional filter bag designated as a "#2" has a liquid holding capacity of 4.3 gallons. Depending upon the specific gravity of the liquid within the bag, a full bag could weigh thirty pounds or more. This is difficult to remove from the filter vessel and since the removal of such a bag from the vessel typically involves contact with a side wall of the vessel, breakage of the bag during removal is not uncommon. This invariably results in contamination of the area around the vessel.

When the typical bag is inserted into a cylindrical or conical basket, the bottom of the bag is required to conform to the shape of the basket in three dimensions even though the bag may be manufactured from flat media, i.e., two dimensional. As a result, the filter bags rarely, if ever, fit correctly into the bottom of the basket. To overcome this problem, manufacturers have usually produced oversized bags, longer than the basket, in order to permit forcing of the bottom surface of the bag into the entire contour of the basket. As a result, much of the filter media tends to fold over onto itself and render much of the filter surface unusable. If the filter media is not fully seated in the basket it usually results in the bag bursting along the bottom of the bag as a result of the liquid pressure on the bottom surface.

There have been numerous attempts to design variations of the bag filter in order to minimize the liquid holding capacity while increasing the filtration surface area. One such design is shown in Smith U.S. Pat. No. 4,081,379. In the Smith patent a filter bag design has two rings of different diameters. The outer ring is affixed to the top of the body of the vessel, while the inner ring is seated within the outer ring and generally located on a plane below the outer ring in order to form an annularly shaped filter bag that is continuous from the outer to the inner ring. The particular shape of the annular filter bag provides more available surface than the conventional filter bag but it is difficult to produce as it requires manufacture of a complex shape and it does not provide for positive support of the filtration media within a basket. The Smith design typically involves a sleeve made from a single piece of material which is turned inward to form the inner filter. This results in relatively sharp corners which are difficult to insert into the basket. The Smith bag is not positively supported in a retaining basket and is thus also prone to bursting. It is not uncommon to require the use of a special tool in order to insert this type of bag into a vessel.

Other variations of this design is shown in U.S. Pat. No. 4,749,485 which proposes a triangularly shaped filter; and U.S. Pat. No. 5,484,529 which discloses a cylindrically shaped filter bag which includes a retaining bottom end cap. This is intended to overcome the problem of fitting a filter bag into a basket but does not result in any increased filtration filter area.

It is accordingly a general object of the invention to provide a filter bag and filter bag assembly intended to overcome the disadvantages of the prior art. It is another general object of the invention to provide a filter element assembly, using the principals of the invention to overcome many of the disadvantages of the bag systems and other disadvantages of the cartridge system.

A more specific object of the present invention is to provide a filter element assembly which has at least two cylindrically shaped and concentrically arranged filter sleeves, each connected at one end thereof to an inlet plate, which inlet plate has means to permit entry of liquid to be filtered into the annular space between the filter sleeves. Each sleeve is connected at its other end to a closed end plate preventing flow of unfiltered liquid from the annular space between the sleeves so as to force the liquid through the porous media of the sleeves to effect filtration.

Yet another object of the invention is to provide a filter assembly which achieves increased dirt holding capacity and increased filtration surface area while minimizing liquid capacity.

A still further object of this invention is to provide a liquid filtration element usable in bag filter type vessels which will permit the use of a second stage filter element within the same housing.

A further object of the invention is to provide a liquid filter assembly for use in bag filter systems permitting inline, inlet and outlet conduits, such as commonly used in cartridge systems.

Yet another object of the invention is to provide a liquid filter element assembly for use in cartridge filter systems so that dirt or contaminants are retained in the annular space between the filter sleeves and thus removed from the housing when the filter element is removed.

The above objects, features and advantages, along with other objects, features and advantages will become more apparent from the detailed description of the invention in conjunction with the accompanying drawings to be described more fully hereinafter.

SUMMARY OF THE INVENTION

The present invention is directed to an improved liquid filter element for use in bag type filter systems and for use in cartridge type filter systems.

The filter element assembly of the present invention includes at least two concentrically arranged cylindrically shaped filter sleeves made of porous filter media and which are connected at one end thereof to an inlet plate and at the other end thereof to a terminal or end plate. The inlet plate has inlet holes to allow liquid to enter the annular space between the concentrically arranged cylinders so that filtration of contaminants in the liquid can take place as the liquid passes through both the outer cylinder, into the space between the outer sleeve and the inner wall of the vessel, and through the inner cylinder into the interior space in the center of the inner cylinder. The terminal plate has a single central opening which is smaller in diameter than the diameter of the inner cylinder. Contaminated fluid enters the filter element assembly through the holes in the inlet plate. Contaminated material will thus remain within the annular space formed between the concentric cylinders and between the inlet and terminal plates. Liquid to be filtered will pass through the porous cylinder walls. In one embodiment, the foregoing assembly is collapsible and can be supported within a basket having perforated cylindrical walls or wire mesh walls thus preventing the cylindrical filter walls from bursting, while allowing the liquid to pass through the basket. The filter element assembly and the basket can thus be placed within a typical cylindrical filter vessel having inlet and outlet conduits as well as means for sealing the filter element assembly within the vessel to prevent any bypass of unfiltered liquid around the filter assembly.

In another embodiment, the filter element assembly is supported by an outer cylindrical perforated cage, which is connected to at least one end cap adapted to be supported in a standard cartridge filter housing. A perforated inner core element may also be used to support the inner sleeve of filter media.

The foregoing and other features of the present invention are more fully described with reference to the following drawings annexed hereto.

DESCRIPTION OF THE INVENTION

Figure 1:
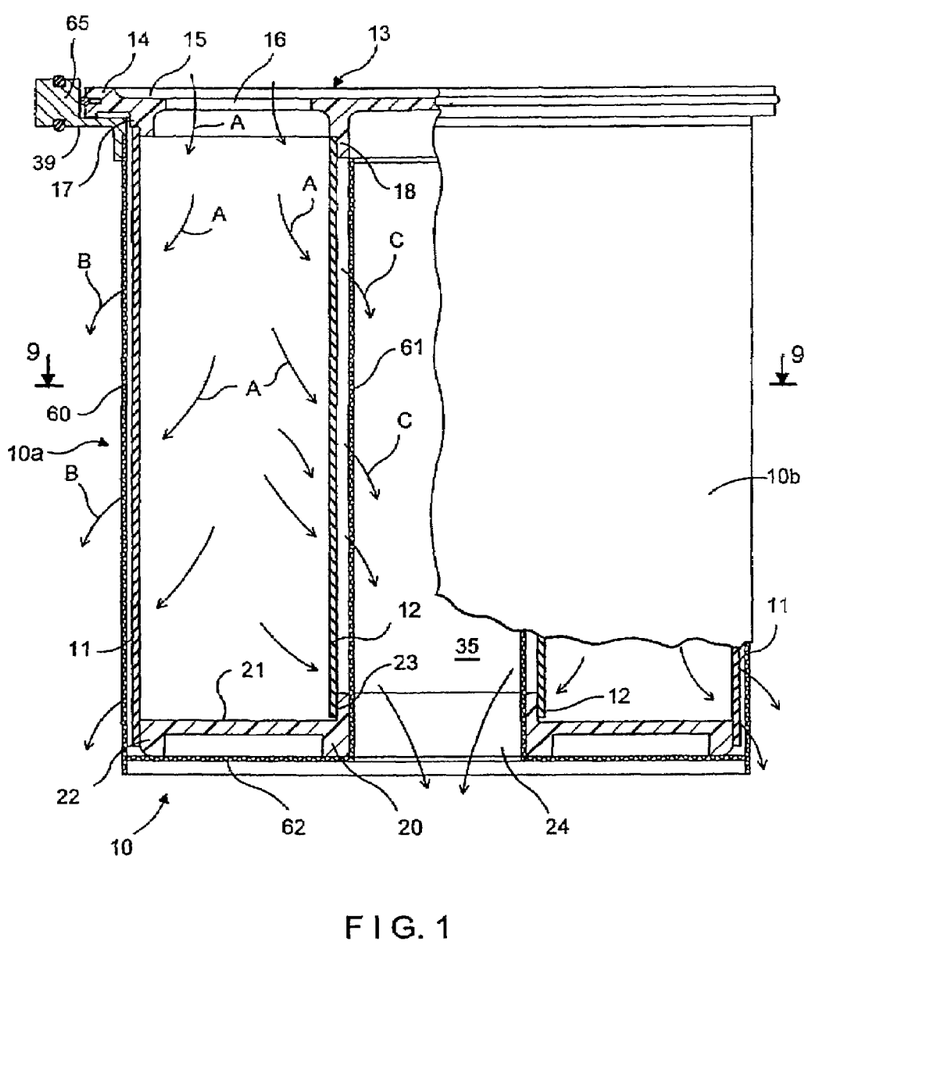
FIG. 1 is a side and partial cutaway sectional view of a filter bag assembly according to one embodiment of the present invention.

With reference to FIG. 1, a preferred embodiment of the filter assembly of the present invention is illustrated. Filter 10 of this embodiment includes an annularly shaped support basket 10a and insert or element 10b arrange to be carried by the support basket. Support basket 10a includes a basket flange 65, which is adapted to be supported on a shoulder within a filter housing or vessel, and cylindrically shaped wire mesh screens 60 and 61 which depend from the basket flange 65. Insert 10b has a cylindrical outer sleeve 11 and a cylindrical inner sleeve 12 disposed concentrically within the outer sleeve 11. Outer and inner sleeves 11 and 12 can be made of a variety of porous filter media materials through which liquid to be filtered can pass for filtering out contaminants. Such materials include nylon, polypropylene, needle punched felt and other such similar filter media. The sleeves 11 and 12 are connected at one end to an inlet plate 13 and at the other end to a terminal plate 20. Inlet plate 13 is shown in greater detail in FIG. 2 and includes an annular sealing ring 14 which is integrally formed with a fluid receiving planar surface 15. Surface 15 has a series of holes or openings 16 which are arranged so that liquid to be filtered will pass through the holes 16 into the annular space between concentrically arranged sleeves 11 and 12, as indicated by arrows "A". Surface 15 also has an area 15' which has no holes and is positioned to prevent flow of liquid into the space interiorly of sleeve 12. Cylindrically shaped flange 18 depends from the surface 15 in order to provide a surface for attachment of inner sleeve 12. An annularly shaped flange 17 depends from ring 14 to provide a surface for attachment of outer sleeve 11. Accordingly, outer sleeve 11 and inner sleeve 12 are connected to the inlet plate 13 at depending annular flanges 17 and 18 respectively. Attachment can be accomplished through a variety of means, the most efficient of which will be ultrasonic welding.

Figure 2:
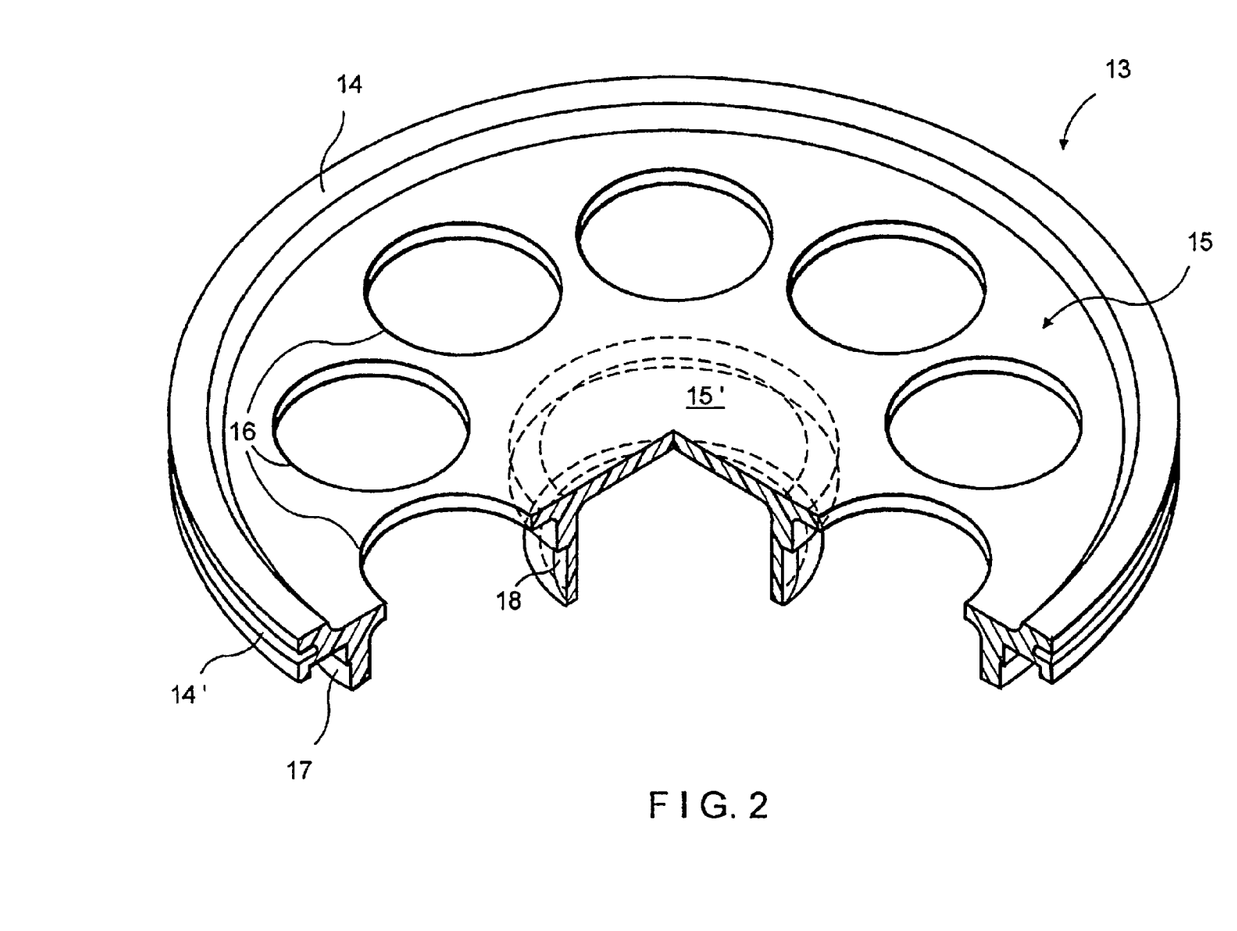
FIG. 2 is a perspective view, partially cut away and shown in section, of the inlet plate shown in FIG. 1.

The inlet plate can be made of a unitary construction such as by injection molding of polymeric material such as polypropylene. Outer and inner sleeves 11 and 12 can similarly be made from polymeric material such as polypropylene thus permitting easy connection at areas 17 and 18 by ultrasonic welding. Other appropriate means of connecting the outer and inner sleeves to the inlet plate, such as through the use of appropriate adhesives can also be used.

Figure 3:
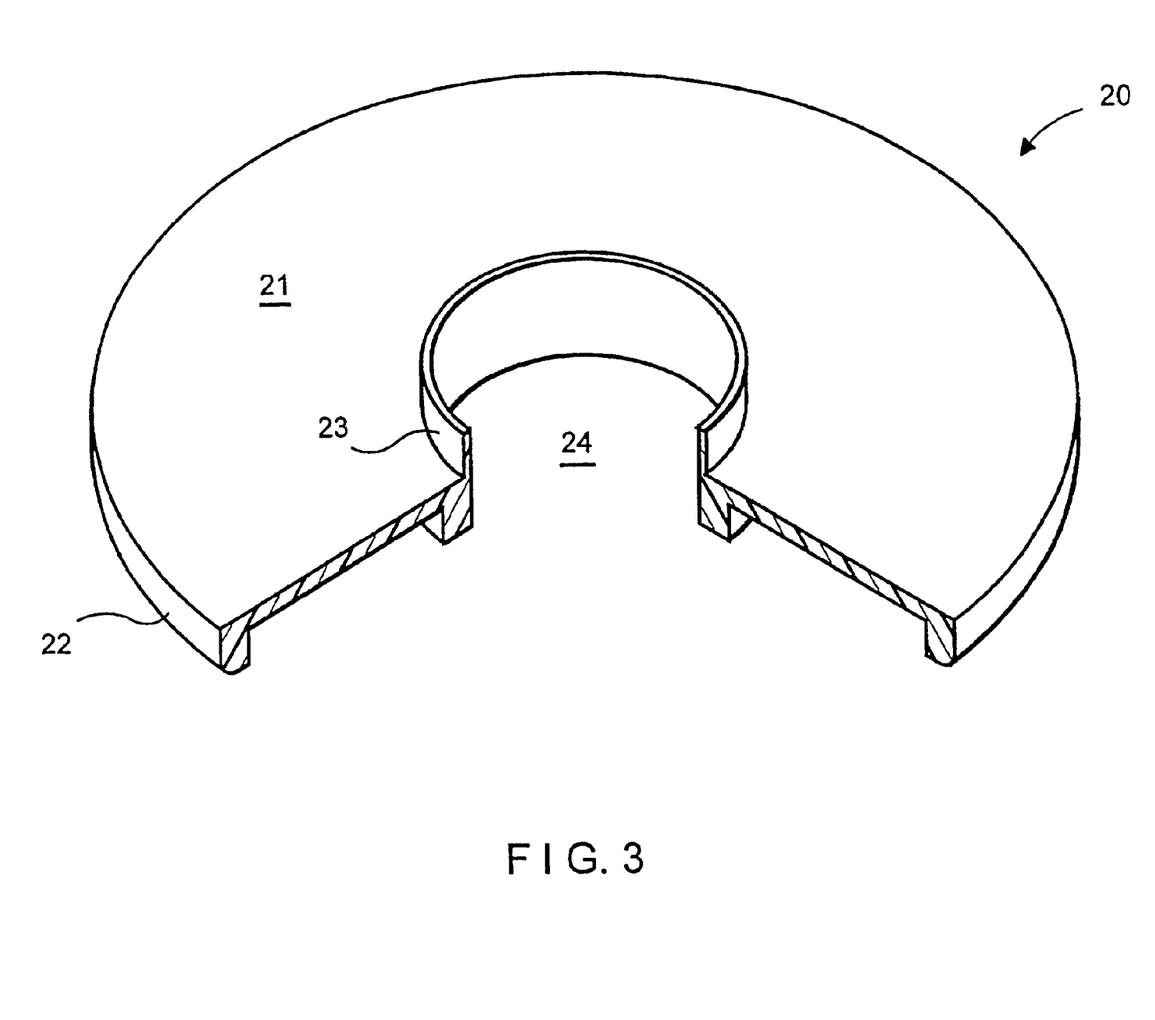
FIG. 3 is a perspective view, partially cut away and shown in section, of the terminal plate shown in FIG. 1.

Terminal plate 20, shown in greater detail in FIG. 3, is also preferably formed through a process of injection molding from polymeric material such as polypropylene and includes a closed surface 21 to be located at the bottom of the annular space between sleeves 11 and 12. A depending annular wall or flange 22 is located at the outer peripheral end of surface 21 to provide a surface area for connecting the bottom of sleeve 11 to the terminal plate. An upwardly extending cylindrical wall or flange 23 is arranged to provide a surface for connecting the bottom of sleeve 12 to terminal plate 20. Accordingly, outer and inner sleeves 11 and 12 are connected to the terminal plate 20 at areas 22 and 23 respectively. An opening 24 is located at the center of terminal plate 20.

With the bottom of the annular space between outer and inner sleeves 11 and 12 closed by the surface 21, liquid to be filtered entering the annular space between sleeves 11 and 12 through openings 16 in the inlet plate 13, as indicated by arrows marked by reference letter "A", will be forced to pass through the porous filter media of sleeve 11 (arrows "B") or through the inner sleeve 12 (arrows "C"), thus passing to the area outside of the assembly 10 or through the opening 24 in terminal plate 20 at the bottom of the interior of cylindrical sleeve 12.

In order to support the sleeves against the pressure of the fluid flow, the element 10b is supported by basket 10a which includes basket flange 65, outer rigid mesh cylindrical screen 60, inner rigid mesh cylindrical screen 61 and a circular rigid mesh bottom screen 62. Outer screen 60 and inner screen 61 are each connected to and carried by basket flange 65, which is adapted to be supported within a filter vessel, at one longitudinal end thereof. The bottom screen 62 is connected, such as by welding, to each of cylindrical screens 60 and 61 at their longitudinal end opposite to the longitudinal end of basket flange 65. Outer cylindrical screen 60 is positioned downstream and concentrically exteriorly of and adjacent to sleeve 11, while inner cylindrical screen 61 is positioned downstream and concentrically interiorly of and adjacent to sleeve 12.

Figure 4:
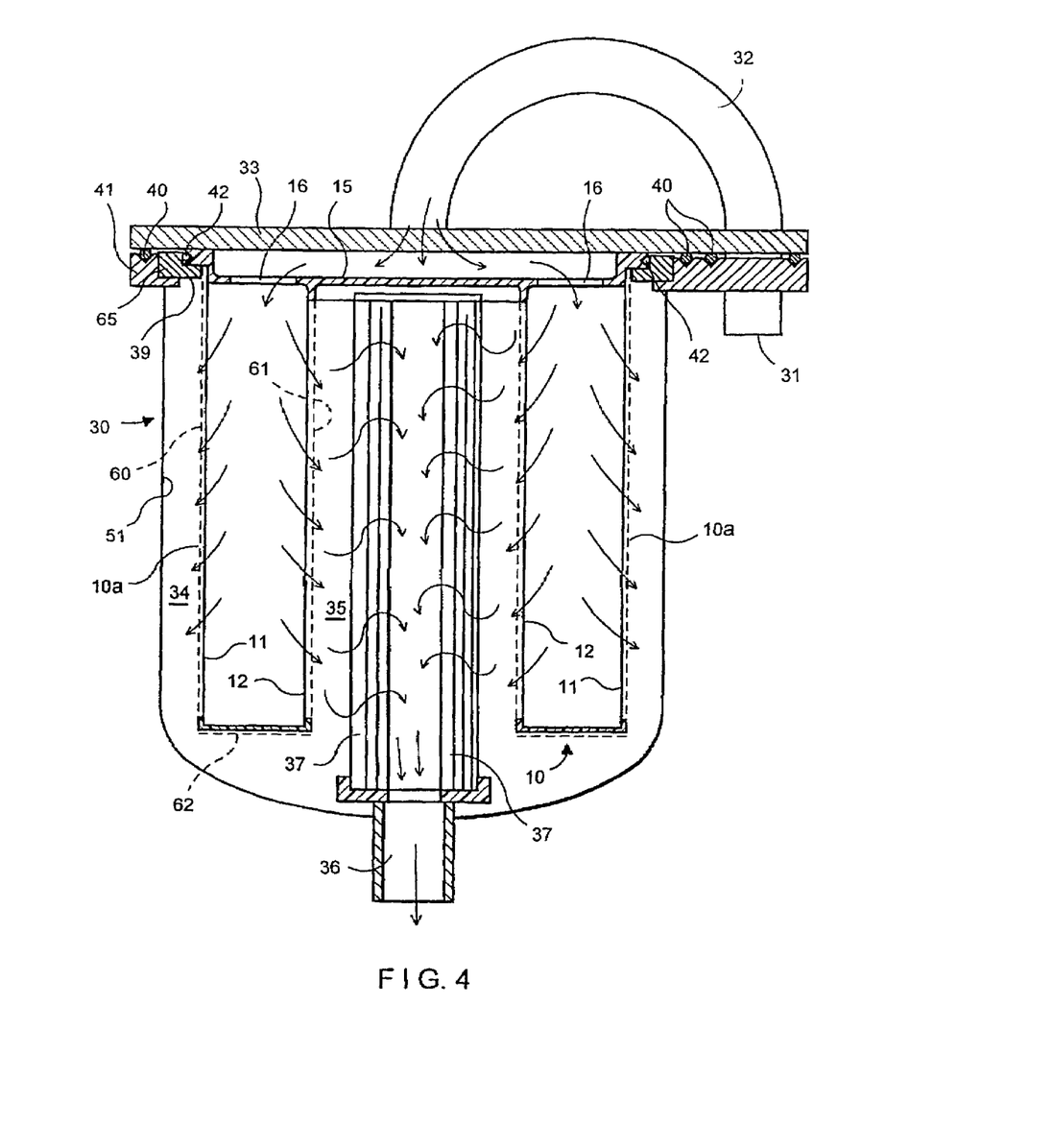
FIG. 4 is a sectional view of yet another embodiment of the present invention depicted within a filter vessel.

When the assembly 10 is placed within a filter vessel 30, such as illustrated in FIG. 4, liquid to be filtered will enter the vessel through the inlet 31, passing via inlet conduit 32 through an openable top cover 33 of the vessel and onto the plate 15 of the filter element 10b. The liquid then passes through openings 16 into the annular space between sleeves 11 and 12. The liquid will then pass through the media of the sleeve 11 and through the mesh of screen 60 into the peripheral space 34 between the inner wall 51 of the vessel 30 and sleeve 11, surrounding the filter assembly 10, or through the sleeve 12 and mesh of screen 61 and into the interior cylindrical space 35 formed by sleeve 12. In the embodiment shown in FIG. 1, the filtered liquid will then pass through the bottom screen 62 to the bottom of the vessel through outlet 36 shown in FIG. 4. In the embodiment shown in FIG. 4 outlet 36 is only accessible through a second stage cartridge filter 37 which may be positioned interiorly of the cylindrical space formed by sleeve 12 so that filtered liquid entering the peripheral space 34 or interior cylindrical space 35 will thence be forced to pass through cartridge filter 37 before being permitted to exit the outlet 36.

The mesh or perforated basket 10a shown schematically in FIG. 4, is positioned within the vessel in order to support the filter media of sleeve 11. The bottom of the basket can be made of similarly perforated material. The filter assembly 10 can be supported within the vessel 30 by allowing the annular ring 14 of the inlet plate to rest on a support shoulder 39 of the basket flange 65 of basket 10a, which in turn is supported in the vessel 30 on a support shoulder 41. Sealing O-rings 40 can be positioned to provide an appropriate seal between the cover 33 and the support 41 of the vessel 30.

Figure 6:
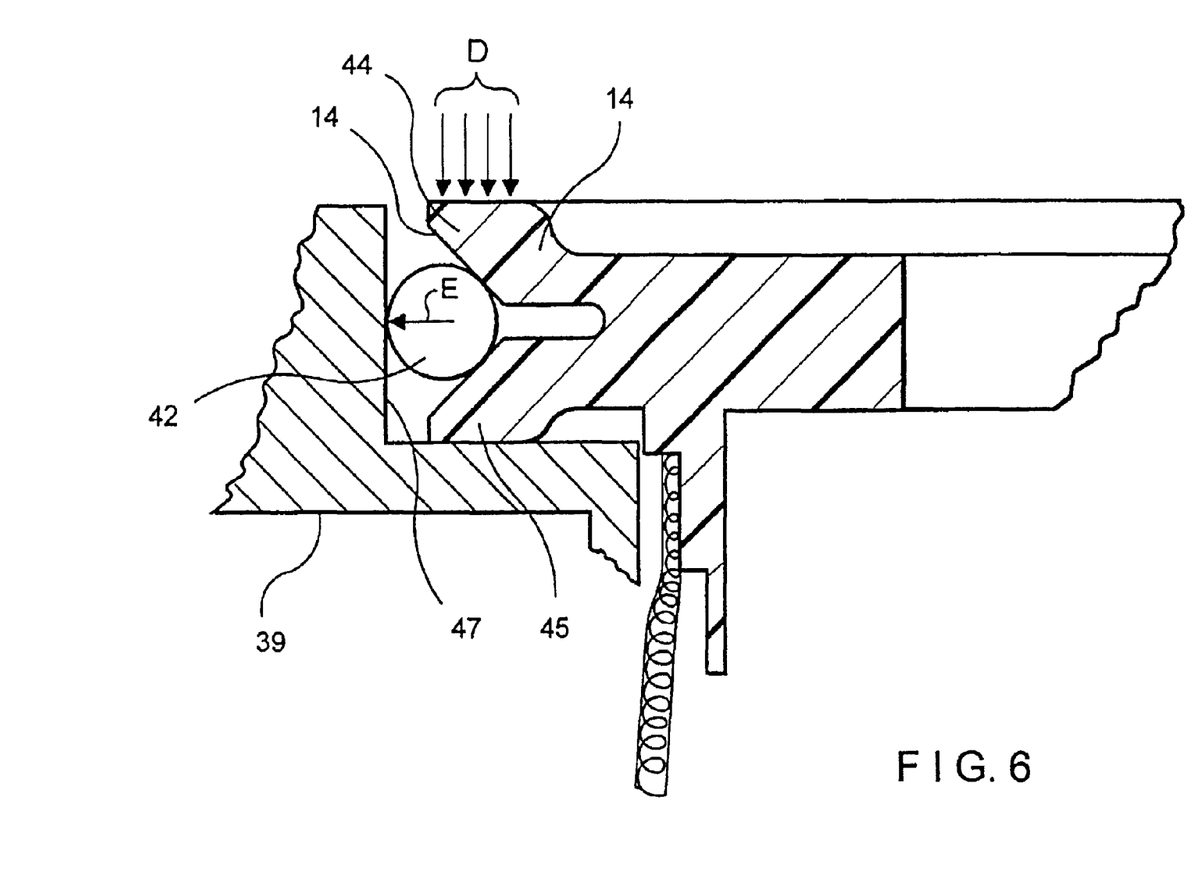
FIG. 6 is a sectional view depicting a sealing mechanism used in the present invention.

Annular ring 14 of the inlet plate 13 supports a circumferential groove 14'. Groove 14' is shown in greater detail in FIG. 6. Groove 14' is generally V-shaped and arranged to accommodate a sealing O-ring 42. Ring 14 is thus bifurcated into an upper fork 44 and a lower fork 45. Upper fork 44 is engaged by the closure lid 33 of the vessel 30 when the filter assembly 10 is housed in place in the vessel. Thus the pressure caused by lid 33 (schematically indicated by arrows "D") causes ring 42 to exert outward pressure against inner wall 47 of the basket support 39 (indicated by arrow "E") thus causing a more positive seal with the inner wall 47 of the basket support 39.

Figure 5:
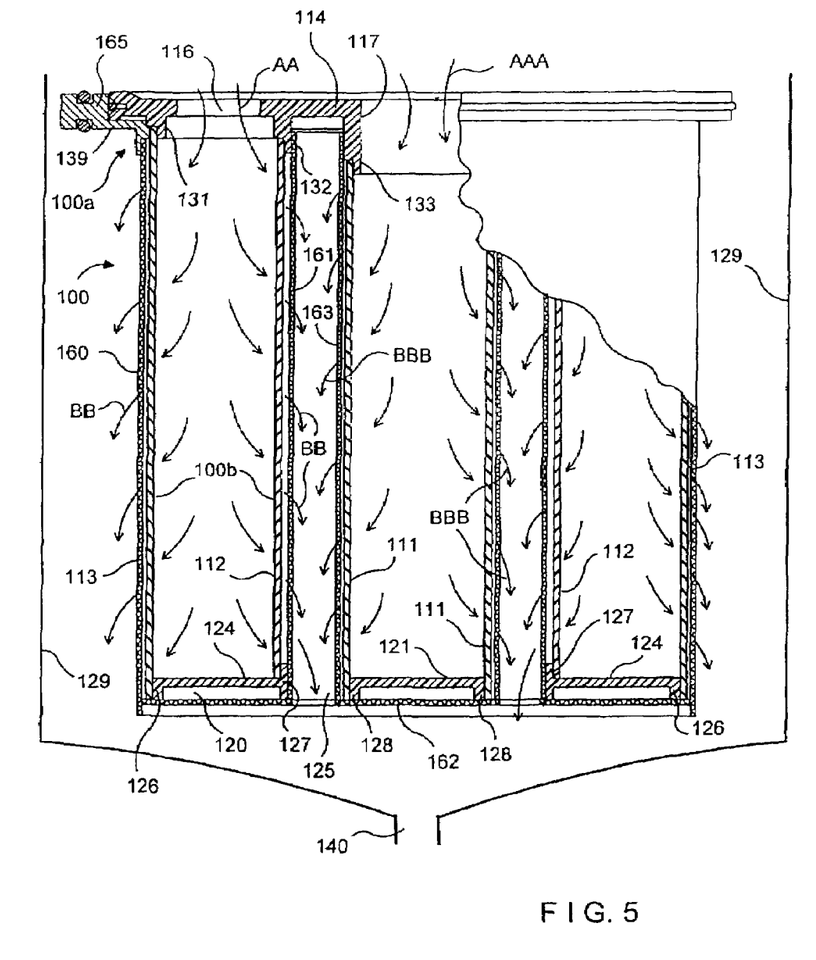
FIG. 5 is a side view, partially cut away and shown in section of yet another embodiment of the present invention.

FIG. 5 illustrates yet another embodiment of the present invention consisting of a filter assembly 100 which includes filter insert 100b supported by basket 100a. Basket 100a includes a basket flange 165 having a shoulder 139 and depending mesh screens 160, 161 and 163. Filter insert 100b has three concentrically arranged flexible filter media sleeves 111, 112 and 113. In this arrangement, filter insert 100b also has an inlet plate 114, a first terminal plate 120 and a second terminal plate 121. Inlet plate 114 has a plurality of openings or holes 116 to allow incoming fluid (represented by arrows "AA") to enter the annular space between filter media sleeves 112 and 113. Inlet plate 114 also has a central opening 117 which allows incoming liquid (represented by arrows "AAA") to enter the cylindrical space interiorly of sleeve 111. Hence, liquid which enters the annular space between sleeves 112 and 113 will be filtered by passing through the media of sleeves 112 and 113 and the screens 160 and 161 respectively of basket 100a. The liquid being filtered by passing through sleeve 112 (represented by arrows "BB") will, after being filtered and passing through mesh screen 161, pass into the annular space formed between sleeves 111 and 112. Liquid which passes through filter sleeve 113 will pass through screen 160 and enter the annular space formed between screen 160 of basket 100a and the inner wall of the vessel (schematically shown and indicated as reference numeral 129 in FIG. 5). Liquid "AAA" which enters the cylindrical space within sleeve 111 will be filtered by passing through the filter media of sleeve 111 and screen 163 of basket 100a (represented by arrows "BBB"), thus entering the annular space formed between sleeves 111 and 112.

First terminal plate 120 has a closed annular portion 124 and a central opening 125 which forms an outlet opening for filtered liquid "BB" and "BBB" from within the annular space between sleeves 111 and 112 through bottom mesh screen 162. The closed annular portion 124 prevents liquid from exiting the annular space between sleeves 113 and 112, thus causing the liquid in this space to pass through the filtration media of sleeves 113 and 112. Second terminal plate 121 similarly prevents liquid from exiting the central interior space within sleeve 111, thus causing such liquid in this space to pass through the filtration media of sleeve 111. Filtered liquid "BB" which entered the annular space between annular sleeve 113 and inner wall 129 of the vessel will pass to the area at the bottom of the vessel along with the filtered liquid exiting the open center 125 of first terminal plate 120 in order to exit the vessel through outlet 140.

First terminal plate 120 is formed with flanges 126 and 127 which form surfaces to which sleeves 113 and 112 respectively, can be connected by ultrasonic welding or other attachment means. Second terminal plate 121 has a flange 128 which forms a surface to which sleeve 111 can be connected by similar means.

Inlet plate 114 also has depending annular flanges 131, 132 and 133 which form surfaces to which the tops of sleeves 113, 112 and 111 respectively can be connected, such as by ultrasonic welding or other attachment means.

The embodiment of FIG. 5 accordingly provides a filter element having a cumulative surface area formed by the cylindrical surface areas of sleeves 111, 112 and 113.

Figure 7:
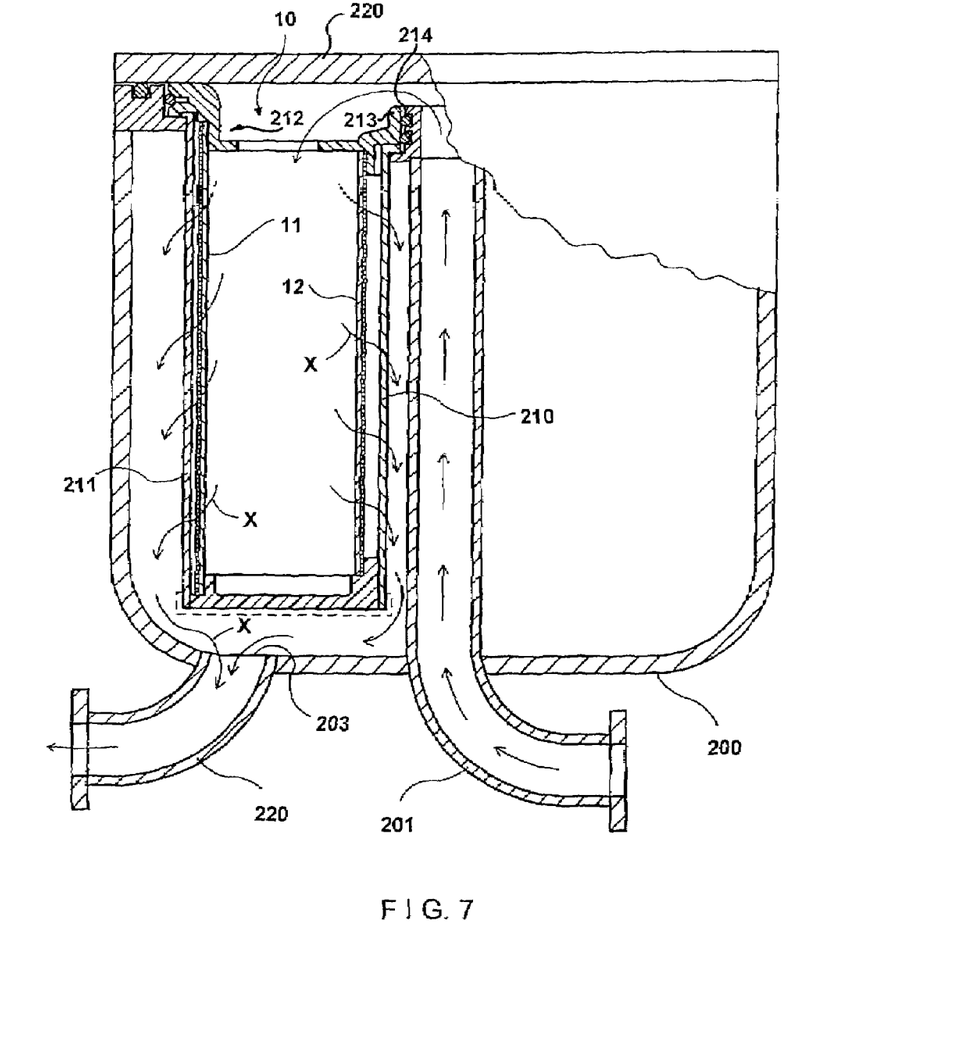
FIG. 7 is a sectional view of a filter vessel configuration having bottom inline inlet and outlet conduits which is permitted by the present invention.

FIG. 7 illustrates a configuration of a generally cylindrical filter vessel which permits the use of inline, inlet and outlet conduits positioned at the bottom of the filter vessel. The vessel has an interior space with a removable lid 220 to provide access to the interior space when the lid is removed or in the open position. In this arrangement inlet conduit 201 enters through the bottom of the vessel and extends upwardly through the center of the vessel. Outlet conduit 202 is connected to an opening 203 offset from the center of the vessel but located at its bottom to provide means for egress of filtered liquid, such as represented by arrows "X". In this arrangement, concentrically arranged perforated cylinders 210 and 211 form a support basket which surround the inlet conduit 201 to support the filter assembly 10. The filter assembly 10, such as described in connection with FIGS. 1, 2 and 3, is disposed within the vessel so that sleeves 11 and 12 are located within the annular space between basket walls 210 and 211. In this embodiment inlet plate 212 has a central "L" shaped flange 213 defining a central opening 214 for receiving and communicating with inlet conduit 201.

Figure 8A:
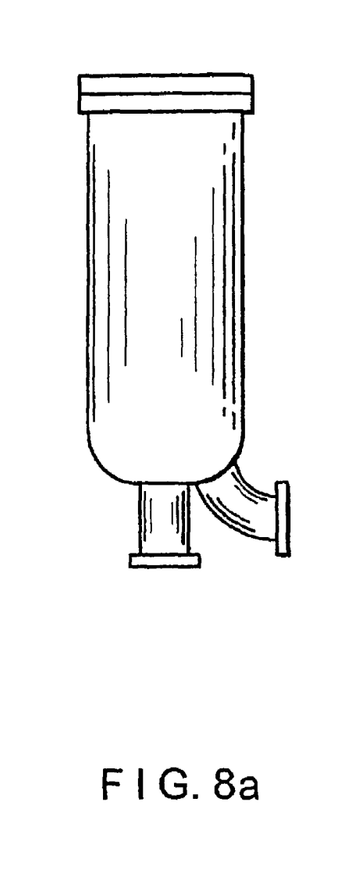
FIGS. 8a, 8b and 8c are side views of bag type filter vessels having different inlet and outlet configurations made possible by the present invention.
Figure 8B:
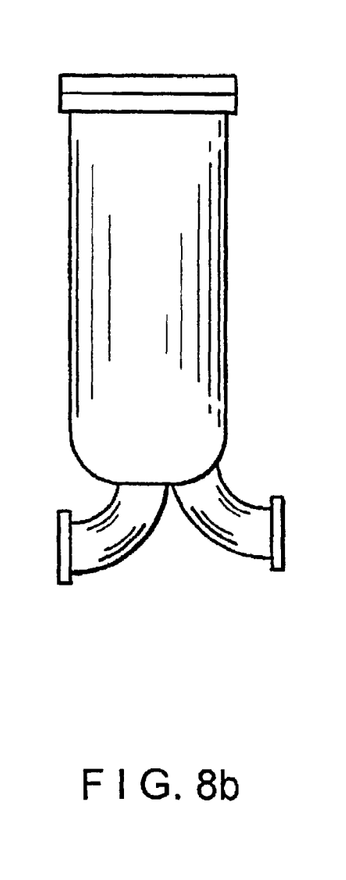
Figure 8C:
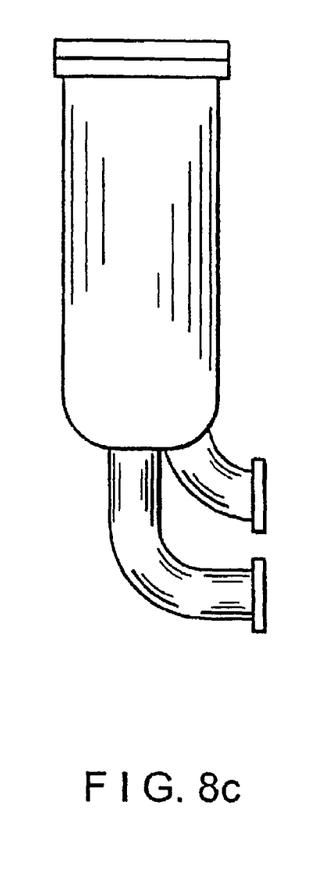
Figure 9:
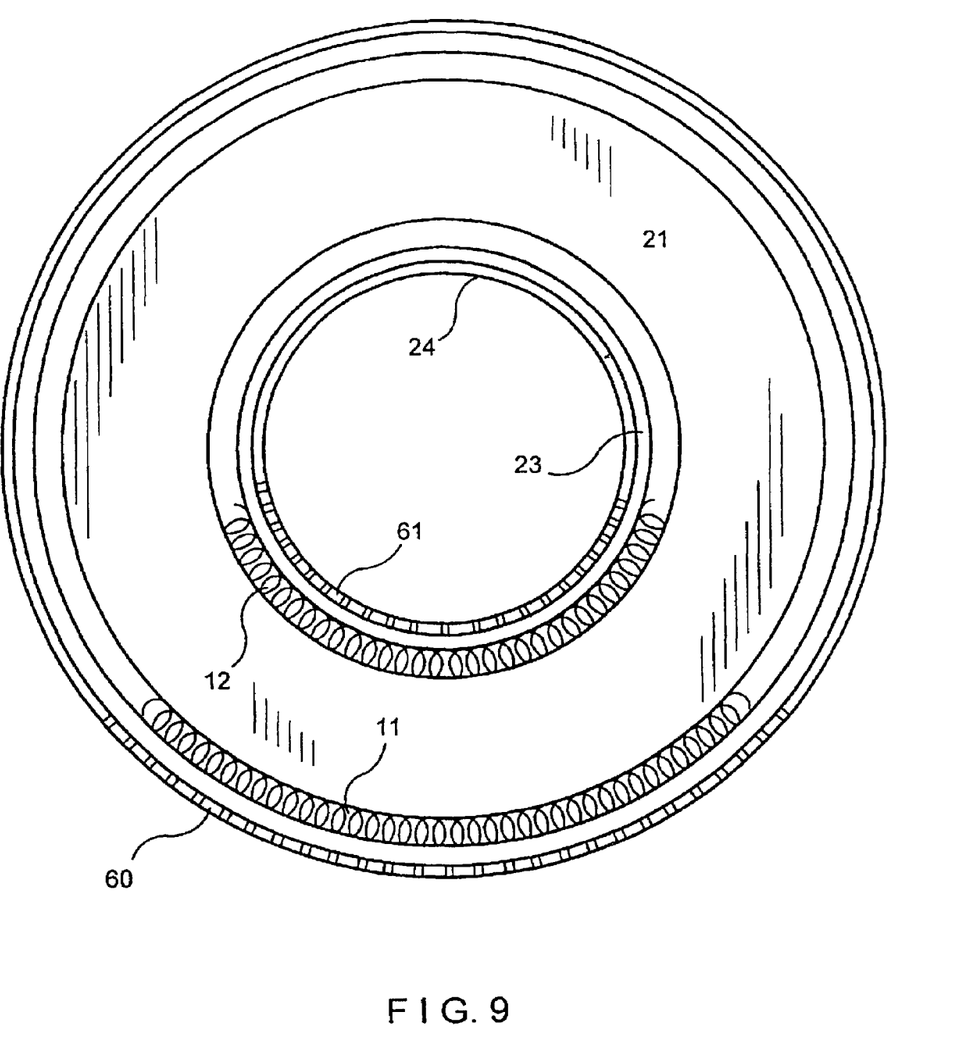
FIG. 9 is a cross-sectional view taken along lines 9—9 of FIG. 1.

Other inlet and outlet conduit arrangements, such as shown in FIGS. 8a, 8b and 8c are thereby made possible through the use of the filter assembly of the present invention.

Figure 10:
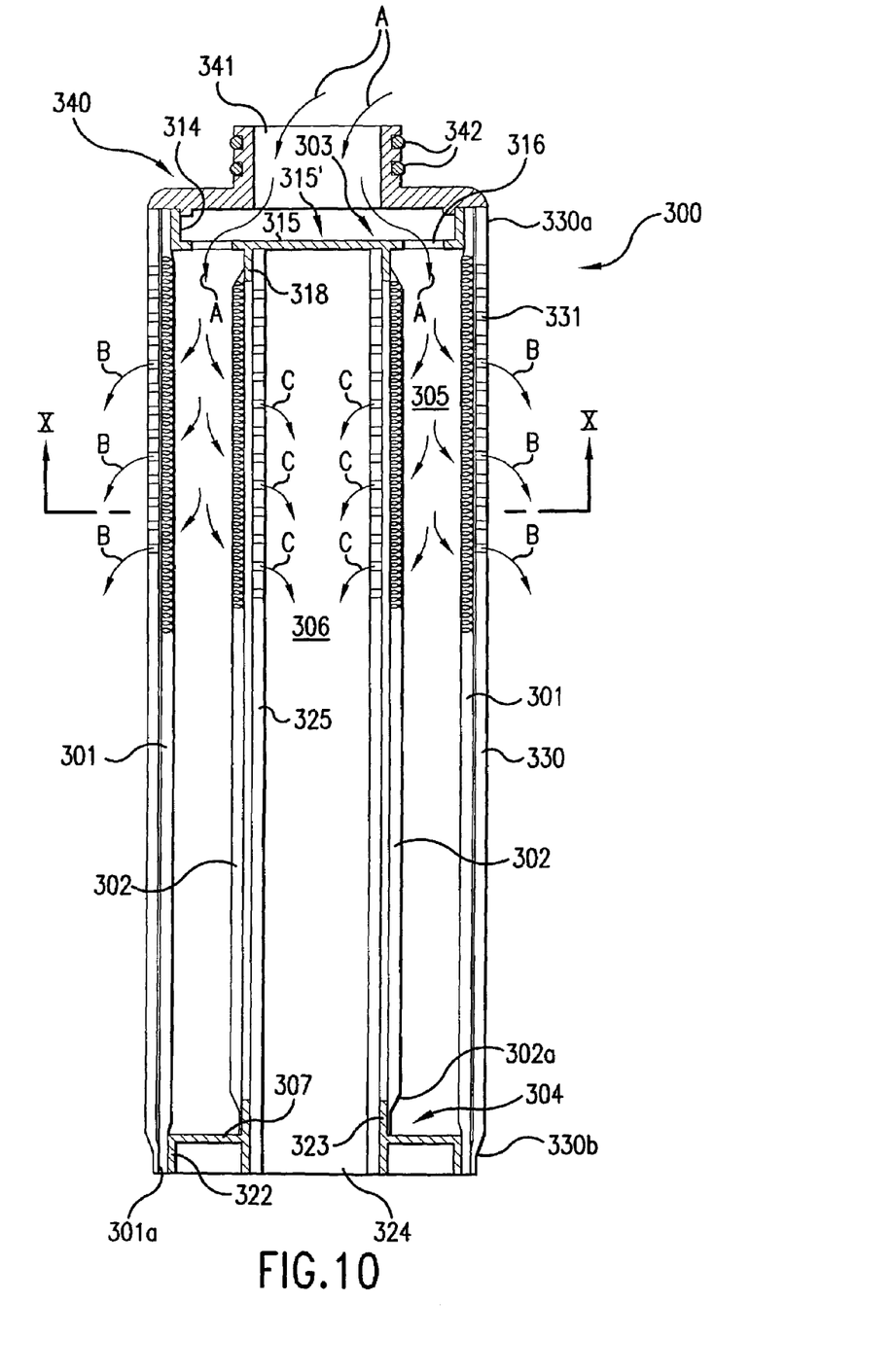
FIG. 10 is a longitudinal sectional view of a further embodiment of the invention.
Figure 11:
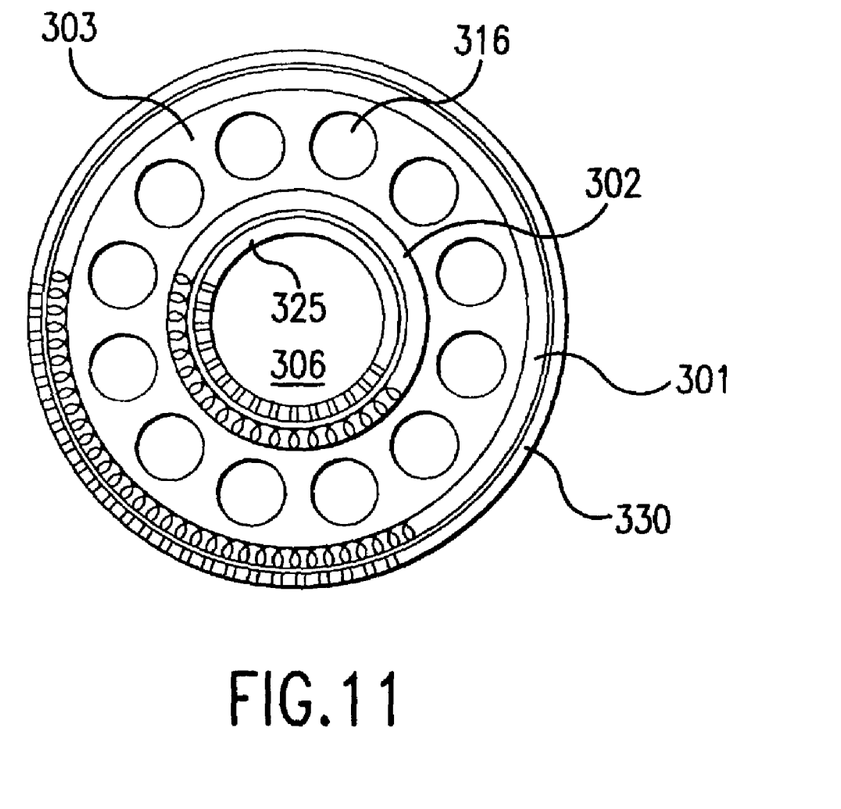
FIG. 11 is a sectional view taken along lines X—X of FIG. 10.

FIGS. 10 and 11 illustrate an embodiment of the present invention intended for use in filter housings designed to accommodate standard cartridge type filters rather than the bag filters described hereinabove. Standard cartridge filters typically have an outside diameter of about 2¾ inches and are provided in overall lengths of 10 inches, 20 inches, 30 inches or 40 inches. In this embodiment, filter element 300 is generally cylindrical and can be made to have the same overall dimensions as the standard cartridges. Element 300 has an outer cylindrical sleeve 301 and an inner cylindrical sleeve 302 disposed concentrically interiorly of outer sleeve 301 with an inlet plate 303 and terminal plate 304 located at opposite longitudinal ends of the cylindrical arrangement of sleeves 301 and 302. For ease of reference, the area of the filter assembly 300 having the inlet plate 303 is hereinafter referred to as the "upper end" of the assembly while the area accommodating the terminal plate 304 is referred to hereinafter as the "lower end". The inner and outer sleeves 301 and 302 thus form a concentric cylindrical arrangement with the inlet and terminal plates located at opposite longitudinal ends of the cylindrical arrangement.

As in the embodiment illustrated in FIG. 1, outer and inner sleeves 301 and 302 can be made of a variety of porous filter media materials through which liquid to be filtered can be passed for filtering out dirt, particles and other contaminants. Such materials include nylon, polypropylene, needle punched felt and other such similar filter media. The sleeves 301 and 302 are connected at their upper end to the inlet plate 303 and at the other or bottom end to terminal plate 304. Inlet plate 303 is similar to the inlet plate 13 shown in FIG. 2, with some differences. Inlet plate 303 has an annular ring 314 which is integrally formed with a fluid receiving planer surface 315. Surface 315 has a plurality of holes or openings 316 which communicate with the annular space 305 between the outer and inner sleeves 301 and 302, respectively. Liquid to be filtered is intended to pass through the openings 316 into the annular space 305. Planar surface 315 has an area 315', which is positioned centrally of the planar surface, that has no bore holes therethrough. The central area 315' has a diameter approximately the same as the diameter of, and is located directly in alignment with, the interior cylindrical space 306, which is within the cylindrical space formed by inner sleeve 302. A cylindrical flange 318 depends from the surface 315 in order to provide a surface for attachment of inner sleeve 302. Inner sleeve 302 may be attached to flange 318 in a variety of ways, the most efficient of which is ultrasonic welding. Outer sleeve 301 is attached to annular ring 314 also preferably by ultrasonic welding. Many techniques, however, may be employed to attach both outer and inner sleeves 301 and 302 respectively to the inlet plate 303. Outer and inner sleeves 301 and 302 can be made from a variety of polymeric materials, such as polypropylene. Inlet plate 303 is formed as a unitary construction, such as by injection molding, also of polymeric material such as polypropylene. Thus, attachment of the outer and inner sleeves to the inlet plate 303 is easily accomplished by ultrasonic welding. Other appropriate means for connecting the outer and inner sleeves to the inlet plate 303, such as through the use of appropriate adhesives, can also be used.

Terminal plate 304, similar to terminal plate 20 illustrated in FIG. 3, is also preferably formed through a process of injection molding from polymeric material, such as polypropylene. Annular closed surface 307 is located at the bottom end of the annular space between sleeves 301 and 302 (i.e., the end opposite inlet plate openings 316) to prevent the flow of unfiltered liquid from the annular space 305 so that the liquid to be filtered will be caused to pass through the filter sleeves 301 and 302. A depending annular wall or flange 322 is located at the outer peripheral surface of closed annular surface 307 to provide an area for connecting end 301a to the terminal plate 304. Upstanding cylindrical wall or flange 323 is arranged to provide a surface for connecting the end 302a of sleeve 302 to terminal plate 304. Accordingly, outer and inner sleeves 301 and 302 respectively are connected to the terminal plate 304 at areas 322 and 323 respectively. Opening 324 is located at the central area of terminal plate 304 to provide an exit for liquid that has been filtered through sleeve 302.

An outer cylindrical perforated cage 330, also preferably made of polymeric materials such as polypropylene, cylindrically encloses the assembly of inner and outer sleeves connected to the inlet plate 303 and outlet plate 304 and is positioned adjacent the exterior of sleeve 301 to support it against the radial outward pressure of liquid. Cage 330 is connected to the outer sleeve 301 at its upper and lower ends 330a and 330b, respectively, similarly, preferably by ultrasonic welding, although other means may be used. The perforations 331 of outer cage 330 may be in the form of holes or may be formed in another configuration, such as a lattice structure that is common in cartridge construction. U.S. Pat. No. 4,956,089 illustrates a typical form of cage. A cylindrical perforated inner core 325 is positioned radially inward of and adjacent inner sleeve 302. Core 325, also preferably of polymeric material such as polypropylene, is connected to the inlet plate 303 at annular flange 318 and is connected to the terminal plate 304 at annular flange 323. Thus, outer sleeve 301 is supported against radially outward pressure by outer cage 330 and inner sleeve 302 is supported against radial inward pressure by core 325.

An end cap 340, also typically made of polymeric materials such as polypropylene, is used to cap the upper end of the filter assembly 300 to form an assembly end and is connected to the outer cage 330, the outer sleeve 301, and the inlet plate 303, also by ultrasonic welding. End cap 340 is of a design and configuration which is common in cartridge designs so that it can be supported and accommodated within typical cartridge housings. End cap 340 has an inlet opening 341 through which liquid to be filtered can enter the filter assembly. In the typical manner, end cap 340 is provided with O-rings 342 for proper sealing engagement with the housing inlet structure.

Thus, in a manner similar to that described in connection with the embodiment shown in FIG. 1, liquid to be filtered will enter the filter assembly 300 through end cap inlet opening 341, as indicated by arrows marked by reference letter "A" and will pass over the planar surface 315 of inlet plate 303, passing through openings 316 into the annular space 305 between the outer and inner sleeves 301 and 302, respectively. With the bottom of the annular space 305 closed by surface 307 of terminal plate 304, liquid to be filtered that is entering the annular space between the outer and inner sleeves 301 and 302 will thus be forced to pass through the porous filter media of outer sleeve 301 (arrows "B") and through the porous filter media of inner sleeve 302 (arrows "C"), thus passing to the area outside of the filter assembly 300 or through the opening 324 in the terminal plate 304 at the bottom of the interior of cylindrical space 306.

As noted above, outer cage 330 and inner core 325 support the outer sleeve 301 and inner sleeve 302 respectively against the pressure of the fluid flow. When the filter assembly 300 is placed within a tradition cartridge filter vessel, liquid to be filtered will enter the vessel and be led to the inlet opening 341 of the filter assembly. The liquid will then pass through the openings 316 into the annular space 305 and through the media of outer sleeve 301 as well as through the perforations of outer cage 330 into the peripheral space between the outer surface of cage 330 and the inner wall of the vessel, or through the inner sleeve 302 and the perforations of inner core 325 into the interior cylindrical space 306 formed by core 325. The filtered liquid will then pass through the bottom opening 324 of the terminal plate 304. Thus, any dirt or contaminants that were in the liquid stream "A" will be trapped in the annular space 305 between outer and inner sleeves 301 and 302 and can thus be removed from the cartridge vessel or housing with the removal of the filter element 300, rather than such dirt or contaminants being left behind in the vessel or housing, as is currently typical with cartridge filters in which the liquid flow is from the outside to the inside.

This invention has been described and illustrated in connection with certain preferred embodiments which are illustrative of the principals of the invention. However, it should be understood that various modifications and changes may readily occur to those skilled in the art, and it is not intended to limit the invention to the construction and operation of the embodiment shown and described herein. Accordingly, additional modifications and equivalents may be considered as falling within the scope of the invention as defined by the claims hereinbelow.

The embodiments of the invention in which an exclusive property or privilege is claimed are defined in the following claims.

What is claimed is:

1. A collapsible liquid filter element for use in bag type filtration systems comprising:

first and second cylindrical filter sleeves formed of flexible bag type filter media, said first filter sleeve having a cross-sectional diameter less than the cross-sectional diameter of said second filter sleeve and arranged concentrically within said second filter sleeve forming an annular space therebetween, said first filter sleeve forming a cylindrical space interiorly thereof, an inlet plate connected to both the first and second filter sleeves at one longitudinal end thereof, said inlet plate having an outer circumferential edge and a central area approximately corresponding to the area of said cylindrical space, said first filter sleeve being connected to said inlet plate proximate to the circumference of said central area of said inlet plate, said second filter sleeve being connected to said inlet plate proximate to said outer circumferential edge of said inlet plate, a terminal plate connected at the other longitudinal end of both said first and second filter sleeves, said inlet plate having spaced apart openings provided therethrough, said openings located between said outer circumferential edge and the circumference of said central area for communicating with said annular space between said first and second filter sleeves to thereby permit the flow of liquid to be filtered through said inlet plate and into said annular space, said central area having no openings therethrough to prevent any flow of liquid to bypass said filtration media or through said central area thus preventing the flow of unfiltered liquid into said cylindrical space when said filter element is arranged within said filtration system, said terminal plate having a closed surface to prevent the flow of liquid from said annular space therethrough, said filter element being collapsible so that said inlet plate and said terminal plate are moveable toward and away from each other when said filter element is outside of said filtration system, said filter element adapted to be removeably carried within a support basket when said filter element is positioned within said filtration system, whereby when said filter element is arranged within said filtration system said inlet plate will be oriented to receive liquid to be filtered so that said liquid will pass through said openings into said annular space between said first and second filter sleeves for passing through said filter sleeves for filtration of impurities or particles therefrom.

2. The filter element assembly according to claim 1, wherein said inlet plate includes a planar surface for receiving liquid to be filtered, said openings being arranged through said planar surface, and an inner flange depending from said planar surface at the circumference of said central area, and an outer flange located exteriorly of said inner flange proximate said circumferential edge and depending from said planar surface, said first and second sleeves being connected to said inner and outer flanges respectively, said planar surface of said inlet plate being closed to communication with said cylindrical space.

3. The filter element assembly according to claim 2, wherein said first and second sleeves are ultra-sonically welded to said flanges of said inlet plate.

4. The filter element assembly according to claim 3, wherein said terminal plate has a closed planar surface, an outer flange depending from said terminal plate planar surface, and an inner flange extending from said terminal plate planar surface in a direction opposite to that of said terminal plate outer flange, said first and said second sleeves being ultra-sonically welded to said terminal plate inner and outer flanges respectively.

5. A liquid filter element assembly for use in liquid filtration systems adapted to be accommodated within a bag type filter housing, said filter element assembly comprising:

an annularly shaped support basket for placement within said filter housing and a filter insert removably carried within said basket, said basket having first and second cylindrically shaped and concentrically arranged screens allowing for the free flow of liquid therethrough, said first screen arranged interiorly of said second screen forming a first annular space therebetween, said cylindrical screens being connected to each other by a connecting element located at one longitudinal end thereof, said filter insert adapted to be supported within said first annular space and having first and second cylindrical filter sleeves formed of flexible bag-type filter media, said first filter sleeve having a cross-sectional diameter less than the cross-sectional diameter of said second filter sleeve and arranged concentrically within said second filter sleeve forming a second annular space therebetween and a cylindrical space interiorly of said first filter sleeve, an inlet plate connected at one longitudinal end of both the first and second filter sleeves having openings provided therein for communicating with said second annular space between said first and second filter sleeves to thereby permit the flow of liquid to be filtered into said second annular space, said inlet plate being closed to direct fluid flow therethrough and into said cylindrical space at all times during filtering operations, when said filter insert is supported within said first annular space, and a terminal plate connected at the other longitudinal end of said first and second filter sleeves to prevent the flow of liquid from said second annular space therethrough, whereby when said filter insert is carried within said basket said first filter sleeve of said filter insert is positioned adjacent and concentrically exteriorly of said first screen of said basket, and said second filter sleeve of said filter insert is positioned adjacent and concentrically interiorly of said second screen of said basket so that said first and second screens of said basket support said first and second filter sleeves respectively of said filter insert against the pressure of liquid flow, and said inlet plate of said filter insert will be oriented to receive liquid to be filtered so that said liquid will pass through said openings into the annular space between said first and second filter sleeves to effect filtration of impurities or particles therefrom and not into said cylindrical space.

6. The filter element assembly according to claim 5 wherein said filter insert is collapsible so that said inlet plate and said terminal plate are movable toward and away from each other when said filter insert is outside of said basket.

7. The filter element assembly according to claim 6, wherein said inlet plate further comprises a rigid planar surface for receiving liquid to be filtered, said openings being arranged through said planar surface.

8. The filter element assembly according to claim 7, wherein said inlet plate further comprises inner and outer flanges to which said first and second sleeves are respectively connected, said flanges extending away from said planar surface in a direction toward said terminal plate.

9. The filter element assembly according to claim 8, wherein said inlet plate, said terminal plate and said first and said second sleeves are polypropylene.

10. The filter element assembly according to claim 9, wherein said first and second sleeves are ultra-sonically welded to said flanges of said inlet plate.

11. The filter element assembly according to claim 9, wherein said terminal plate has a closed planar surface, an outer flange depending from said closed planar surface, and an inner flange extending from said closed planar surface in a direction opposite to that of said outer flange.

12. The filter element assembly according to claim 11, wherein said first and said second filter sleeves are ultra-sonically welded to said inner and outer flanges respectively of said terminal plate.

13. The filter element assembly according to claim 5, further comprising means for supporting said filter element assembly within said housing.

14. The filter element assembly according to claim 13, wherein said means for supporting said filter element assembly within said housing comprises an annular ring formed integrally with said inlet plate, a shoulder formed on said basket for supporting said ring, said shoulder arranged to be supported by said housing.

15. The filter element assembly according to claim 14, wherein said ring of said inlet plate supports a V shaped groove the open end of which faces a direction perpendicular to the longitudinal axis of said filter element assembly, and further comprising an O-ring carried within said groove, whereby when said filter insert is supported within said basket said O-ring will engage a side wall surface of said basket.

16. The filter element assembly according to claim 15, wherein said V shaped groove comprises upper and lower forks, whereby when said assembly is carried within a housing said upper fork is positioned to be pressed against by a cover plate of said housing to thereby compress said O-ring causing said O-ring to exert a force against said side wall surface of said basket to effect a fluid seal.

17. The filter element according to claim 16, further comprising a second stage cartridge filter carried by said assembly and located interiorly of said first screen of said basket.

18. The filter assembly according to claim 5 wherein said cylindrical screens are perforated screens.

19. The filter assembly according to claim 18 wherein said perforated screens are mesh screens.

20. The filter assembly according to claim 5, wherein said connecting element is circular.

21. A collapsible liquid filter element for use in bag type filtration systems comprising:
first and second cylindrical filter sleeves formed of flexible bag-type filter media, said first filter sleeve having a cross-sectional diameter less than the cross-sectional diameter of said second filter sleeve and arranged concentrically within said second filter sleeve forming an annular space therebetween, said first filter sleeve forming a cylindrical space interiorly thereof;
an inlet plate connected to both the first and second filter sleeves at one longitudinal end thereof, said inlet plate having an outer circumferential edge and a central area approximately corresponding to the area of said cylindrical space, said first filter sleeve being connected to said inlet plate proximate to the circumference of said central area of said inlet plate, said second filter sleeve being connected to said inlet plate proximate to the outer circumferential edge of said inlet plate, said inlet plate having openings provided therein between said outer circumferential edge and the circumference of said central area for communicating with said annular space between said first and second filter sleeves to thereby permit the flow of liquid to be filtered into said annular space, said central area having no bore holes therethrough to prevent the flow of said liquid into said cylindrical space;
a terminal plate connected at the other longitudinal end of both said first and second filter sleeves, said terminal plate having a closed surface to prevent the flow of liquid from said annular space therethrough;
said filter element being collapsible so that said inlet plate and said terminal plate are moveable toward and away from each other when said filter element is outside of said filtration system, and adapted to be carried within a support basket with said inlet plate oriented to receive liquid to be filtered so that said liquid to be filtered will pass through said openings into said annular space between said first and second filter sleeves for passing through said filter sleeves for filtration of impurities or particles therefrom when said filter element is positioned within said filtration system and to prevent the flow of unfiltered liquid to bypass said filter media.

22. A liquid filter element for use in filtration systems comprising:
filtration means including first and second cylindrical, flexible, bag-type filter media and arranged to form an annular space and an interior cylindrical space;
an inlet plate connected to said filtration means at one longitudinal end thereof, said inlet plate having spaced openings provided therethrough for permitting fluid communication with said annular space to thereby permit the flow of liquid to be filtered into said annular space and a central area with no bore holes preventing the flow of said unfiltered liquid into said cylindrical space;
terminal end means connected at the other longitudinal end of said filtration means for preventing the flow of liquid from said annular space therethrough;
said filter element being collapsible so that said inlet plate and said terminal end means are moveable toward and away from each other when said filter element is outside of said filtration system, and adapted to be carried within a support basket with said inlet means oriented to receive liquid to be filtered so that said liquid to be filtered will pass through said openings into said annular space for passing through said filtration means for filtration of impurities or particles therefrom when said filter element is positioned within said filtration system.

* * * * *